US 12,287,795 B2

(12) United States Patent
Donato et al.

(10) Patent No.: US 12,287,795 B2
(45) Date of Patent: Apr. 29, 2025

(54) BEAM SEARCH DECODING WITH FORWARD-LOOKING SCORES

(71) Applicant: DeepMind Technologies Limited, London (GB)

(72) Inventors: Domenic Joseph Donato, Oviedo, FL (US); Christopher James Dyer, London (GB); Rémi Leblond, Cachan (FR)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 18/401,120

(22) Filed: Dec. 29, 2023

(65) Prior Publication Data

US 2024/0220506 A1   Jul. 4, 2024

Related U.S. Application Data

(60) Provisional application No. 63/436,468, filed on Dec. 30, 2022.

(51) Int. Cl.
*G06F 16/00* (2019.01)
*G06F 16/2457* (2019.01)
*G06F 40/284* (2020.01)

(52) U.S. Cl.
CPC ...... *G06F 16/24573* (2019.01); *G06F 40/284* (2020.01)

(58) Field of Classification Search
None
See application file for complete search history.

(56) References Cited

U.S. PATENT DOCUMENTS

2023/0029590 A1* 2/2023 De Freitas Adiwardana .............. G06N 3/045
2023/0244934 A1* 8/2023 Lazaridou ............. G06F 16/953 706/25
2024/0267529 A1* 8/2024 Chen ...................... H04N 19/14

OTHER PUBLICATIONS

Barrault et al., "Proceedings of the Fifth Conference on Machine Translation." Proceedings of the Fifth Conference on Machine Translation, Nov. 2020, 36 pages.
Bhattacharyya et al., "Energy-based reranking: Improving neural machine translation using energy based models" CoRR, Submitted on Sep. 2021, arXiv:2009.13267v4, 10 pages.

(Continued)

*Primary Examiner* — Thu Nguyet T Le
(74) *Attorney, Agent, or Firm* — Fish & Richardson P.C.

(57) ABSTRACT

Methods and systems for beam search decoding. One of the methods includes initializing beam data specifying a set of k candidate output sequences and a respective total score for each of the candidate output sequences; updating the beam data at each of a plurality of decoding steps, comprising, at each decoding step: generating a score distribution that comprises a respective score for each token in the vocabulary; identifying a plurality of expanded sequences; generating, for each expanded sequence, a respective backwards-looking score; generating, for each expanded sequence, a respective forward-looking score; computing, for each expanded sequence, a respective total score from the respective forward-looking score for the expanded sequence and the respective backwards-looking score for the expanded sequence; and updating the set of k candidate output sequences using the respective total scores for the expanded sequences.

20 Claims, 4 Drawing Sheets

(56) References Cited

OTHER PUBLICATIONS

Cettolo et al., "Report on the 11th IWSLT evaluation campaign." Proceedings of the 11th International Workshop on Spoken Language Translation: Evaluation Campaign, Feb. 17, 2014.
Cohen et al., "Empirical analysis of beam search performance degradation in neural sequence models" In Proceedings of the 36th International Conference onMachine Learning, May 2019, 10 pages.
Dusek et al., "Sequence-to-Sequence Generation for Spoken Dialogue via Deep Syntax Trees and String" CoRR, Submitted on Jun. 2016, arXiv:1606.05491v1, 7 pages.
Github.com [online], "JAX: composable transformations of Python+ NumPy programs" Nov. 2019, retrieved on Dec. 24, 2024, retrieved from URL <https://github.com/jax-ml/jax>, 8 pages.
Hargreaves et al., "Incremental beam manipulation for natural language generation" CoRR, Submitted on Mar. 2021, arXiv:2102.02574v3, 14 pages.
Hart et al., "A formal basis for the heuristic determination of minimum cost paths." IEEE transactions on Systems Science and Cybernetics 4.2, Jul. 1968, 100-107.
He et al., "Decoding with value networks for neural machine translation." Advances in Neural information processing systems 30, 2017, 10 pages.
Holtzman et al., "The curious case of neural text degeneration" CoRR, Submitted on Apr. 2019, arXiv:1904.09751v1, 11 pages.
Jouppi et al., "In-datacenter performance analysis of a tensor processing unit" CoRR, Submitted on Apr. 2017, arXiv:1704.04760v1, 17 pages.
Klein et al., "Opennmt: Open-source toolkit for neural machine translation" CoRR, Submitted on Mar. 2017, arXiv:1701.02810v2, 6 pages.
Kumar et al., "Minimum bayes-risk decoding for statistical machine translation." Proceedings of the Human Language Technology Conference of the North American Chapter of the Association for Computational Linguistics: HLT-NAACL, 2004, 8 pages.
Leblond et al., "Machine translation decoding beyond beam search" CoRR, Submitted on Apr. 2021, arXiv:2104.05336v1, 23 pages.
Murray et al., "Correcting Length Bias in Neural Machine Translation" CoRR, Submitted on Aug. 2018, arXiv:1808.10006v2, 12 pages.
Post, "A Call for Clarity in Reporting BLEU Scores" CoRR, Submitted on Sep. 2018, arXiv:1804.08771v2, 6 pages.
Ren et al., "Deep reinforcement learning-based image captioning with embedding reward" In 2017 IEEE Conference on Computer Vision and Pattern Recognition, 2017, 290-298.
Sennrich et al., "Neural machine translation of rare words with subword units" CoRR, Submitted on Jun. 2016, arXiv:1508.07909v5, 11 pages.
Shazeer, "Fast transformer decoding: One write-head is all you need" CoRR, Submitted on Nov. 2019, arXiv:1911.02150v1, 9 pages.
Shen et al., "Minimum risk training for neural machine translation" In Proceedings of the 54th Annual Meeting of the Association for Computational Linguistics (vol. 1: Long Papers), Aug. 2016, 1683-1692.
Stahlberg et al., "On NMT search errors and model errors: Cat got your tongue?" CoRR, Submitted on Aug. 2019, arXiv:1908.10090v1, 7 pages.
Vaswani et al., "Attention is all you need" CoRR, Submitted on Jun. 2017, arXiv:1706.03762v4, 15 pages.
Wang et al., "Investigating the Decoders of Maximum Likelihood Sequence Models: A Look-ahead Approach" CoRR, Submitted on Mar. 2020, arXiv:2003.03716v1, 7 pages.
Wu et al., "Google's neural machine translation system: Bridging the gap between human and machine translation" CoRR, Submitted on Oct. 2016, arXiv:1609.08144v2, 23 pages.
Yang et al., "Breaking the beam search curse: A study of (re-) scoring methods and stopping criteria for neural machine translation" CoRR, Submitted on Oct. 2018, arXiv:1808.09582v3, 6 pages.

* cited by examiner

BEAM SEARCH DECODING WITH FORWARD-LOOKING SCORES

CROSS-REFERENCE TO RELATED APPLICATION

This application claims priority to U.S. Provisional Application No. 63/436,468, filed on Dec. 30, 2022. The disclosure of the prior application is considered part of and is incorporated by reference in the disclosure of this application.

BACKGROUND

This specification relates to generating output sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that uses a beam search technique to "decode" an output from an auto-regressive neural network. In particular, the system described in this specification uses a total score that is determined based on a backwards-looking score and a forward-looking score.

Particular embodiments of the subject matter described in this specification can be implemented so as to realize one or more of the following advantages.

Beam search is the most widely used decoding technique for neural machine translation and many other machine learning tasks that require generating an output sequence from a network input. In particular, beam search generally significantly outperforms other decoding mechanisms at a reasonable computational cost. However, beam search can mistakenly discard many high scoring hypotheses, i.e., candidate output sequences that currently do not have a high enough score to remain in the "beam" but that would result in a high scoring output sequence if further expanded, decreasing the quality of the final output.

In particular, beam search is biased against finding high-quality sequences that require the generation of low probability sub-sequences at the start of the decoding process, i.e., because beam search is likely to discard these low probability sub-sequences and prevent them from being expanded further in order to eventually generate a high quality output. Another frequently occurring issue with beam search is that selecting high scoring initial sub-sequences (as is done in beam search) leads to situations where there is no valid continuation available to the model and beam search therefore cannot discover a valid output sequence.

This specification describes a modification to beam search that addresses these issues and therefore significantly improves the quality of the decoded output sequence. For example, the described modification can result in identifying higher-scoring output sequences with a smaller beam size than conventional beam search, significantly improving the computational efficiency of the decoding.

In particular, unlike conventional beam search, which ignores future scores, the described modified beam search technique computes a total score at each decoding step that is based on both a backwards-looking score and a forward-looking score, resulting in improved performance and preventing the system from mistakenly discarding currently low-scoring candidates that would result in high-scoring final output sequences.

More specifically, the described technique can be efficiently implemented on hardware machine learning accelerators, e.g., GPUs, TPUs, or other ASICS. In particular, the system computes future scores via a greedy rollout of the model, i.e., by performing as many neural network inference calls as necessary to satisfy a termination criteria, e.g., to produce an end of sequence token or to reach a maximum sequence length. Because accelerator hardware is optimized for neural network inference, these inference calls can be performed in hardware and the computation of the future-aware scores can therefore be performed with minimal additional latency relative to conventional beam search (which only computes backwards-looking scores).

Moreover, the greedy roll-out is performed using the same neural network that is already being used to generate the score distributions, so the system only needs to store one model in memory on the device on which beam search is being performed. In particular, other beam search modifications use a separate model to estimate scores that attempt to improve on conventional beam search. However, deploying this additional model on device requires additional memory and processor cycles and can require smaller auto-regressive models to be used, degrading performance. Thus, the described technique improves the performance of conventional beam search with minimal overhead and without requiring storing another model in device memory. That is, the device on which the neural network that is being used to generate the score distributions has a fixed amount of memory. Other approaches that attempt to address the above issues with beam search require making use of a separate model, which also needs to be deployed on device. Therefore, because some of the device memory needs to be allocated for the separate model, the neural network may need to be smaller or otherwise less memory-intensive for both models to be able to be deployed on-device. By using the same neural network to both generate the score distributions and to generate the forward-looking scores, the described techniques avoid constraining the neural network as is done by other approaches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
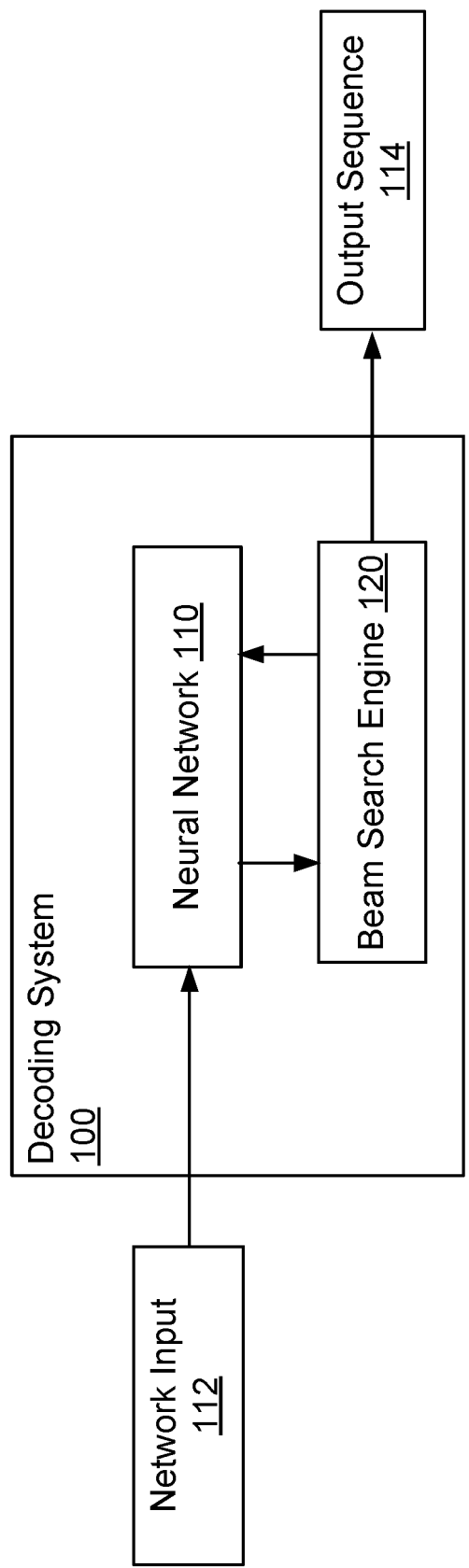
FIG. 1 shows an example decoding system.

FIG. 1 shows an example decoding system 100. The decoding system 100 is an example of a system implemented as computer programs on one or more computers in one or more locations, in which the systems, components, and techniques described below can be implemented.

The system 100 is configured to receive network inputs 112 and generate a respective output sequence 114 for each network input 112 using an auto-regressive neural network 110.

The auto-regressive neural network 110 is a neural network that has been trained to perform a machine learning task that requires mapping network inputs to output sequences.

The neural network 110 is referred to as an "auto-regressive" neural network because the neural network 110 operates auto-regressively when generating any given output sequence.

In particular, given a current partially complete output sequence for a network input 112, the auto-regressive neural network 110 is configured to generate a score distribution over a vocabulary of tokens, i.e., an output that includes a respective score for each token in the vocabulary, conditioned on the current partially complete output sequence and the network input 112. The score for a given token represents the likelihood, as predicted by the neural network 110, that the token should follow the last token in the current partially complete output sequence.

The neural network 110 can have any appropriate architecture that allows the neural network 110 to auto-regressively generate output sequences conditioned on a network input 112.

For example, the neural network 110 can include an encoder neural network that encodes the network input 112 to generate an encoded representation and an auto-regressive decoder neural network that generates the output sequence auto-regressively conditioned on the encoded representation.

The encoder neural network can be any type of neural network that is appropriate for encoding the type of network input 112 required for the task being performed. For example, the encoder can be any of: a Transformer encoder, a convolutional neural network, a recurrent neural network, a multi-layer perceptron (MLP), and so on.

The auto-regressive decoder can be, e.g., an auto-regressive Transformer decoder, a recurrent neural network, or an auto-regressive convolutional neural network (e.g., a Wave-Net).

As another example, the neural network 110 can have a decoder-only architecture, where the network input 112 is prepended onto the current partially generated output sequence. For example, the neural network 110 can be a decoder-only Transformer or a recurrent neural network.

The vocabulary of tokens include a set of vocabulary tokens and an end of sequence token. Vocabulary tokens are tokens that appear in output sequences for the machine learning task. That is, each output sequence 114 that is generated by the system 100 includes a sequence of vocabulary tokens. For example, depending on the task, the vocabulary of tokens can include any of: text tokens, e.g., characters, word pieces, words, numbers, and so on, punctuation tokens, white space tokens, computer code symbols, and so on. The end of sequence token is a token that does not appear in output sequences but which is used by the neural network 110 to signal that the output sequence 114 has terminated.

Generally, the machine learning task can be any of a variety of machine learning tasks that require generating an output sequence and the neural network 110 can have any appropriate auto-regressive architecture.

For example, the machine learning task can be a task that requires generating an output text sequence, e.g., so that the set of vocabulary tokens includes text tokens and, optionally, other types of tokens.

As one example of this, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs. In this example, the source language text may be augmented with an identifier that indicates the target language into which the neural network should translate the source language text.

As another example of this, the task can be a speech recognition task. That is, if the input sequence is a sequence of audio data representing a spoken utterance, the output may be a sequence of text tokens that represents the utterance, i.e., is a transcription of the input sequence.

As another example of this, the task can be a text generation task, where the input is a sequence of text, and the output is another sequence of text, e.g., a completion of the input sequence of text, a response to a question posed in the input sequence, a sequence of text that is about a topic specified by the first sequence of text, or a summary of the input sequence. As another example, the input to the text generation task can include modalities other than text, e.g., an image, an audio signal, and so on, instead of or in addition to text, and the output sequence can be text that describes the input or that is a response to a query included in the input.

As another example of this, the task can be an audio generation task, where the input is a sequence representing an audio signal, and the output is another sequence representing an audio signal, e.g., a completion of the input sequence of audio, a response to a question posed in the input sequence, a sequence of audio that is about a topic specified by the first sequence, and so on. As another example, the input to the audio generation task can include modalities other than audio, e.g., an image, text, and so on, instead of or in addition to audio, and the output sequence can be audio that describes the input or that is a response to a query included in the input.

As another example, the system can be part of a computer code generation system and can receive a context sequence that is a text description of a desired piece of code or a snippet of computer code in a programming language and generate an output sequence of computer code, e.g., a snippet of code that is described by the context sequence or a snippet of code that follows the context sequence in a computer program.

To decode an output sequence 114 from a given network input 112, the system 100 uses the auto-regressive neural network 110 to perform a beam search.

Beam search refers to maintaining a "beam" of a fixed number of candidate output sequences and, at each decoding step, expanding each un-finalized candidate output sequence in the beam to generate a plurality of expanded sequences. At each decoding step, the system 100 then scores each expanded sequence and updates the beam to include only the fixed number of highest scoring sequences among the output sequences and any finalized candidate output sequences already in the beam. Thus, the system maintains a constant-sized beam throughout the decoding process.

Unlike conventional beam search techniques, however, the system 100 applies a beam search technique in which the score for each expanded sequence includes both a backwards-looking component and a forward-looking component.

Performing a beam search to generate an output sequence 114 is described in more detail below with reference to FIGS. 2-4.

Figure 2:
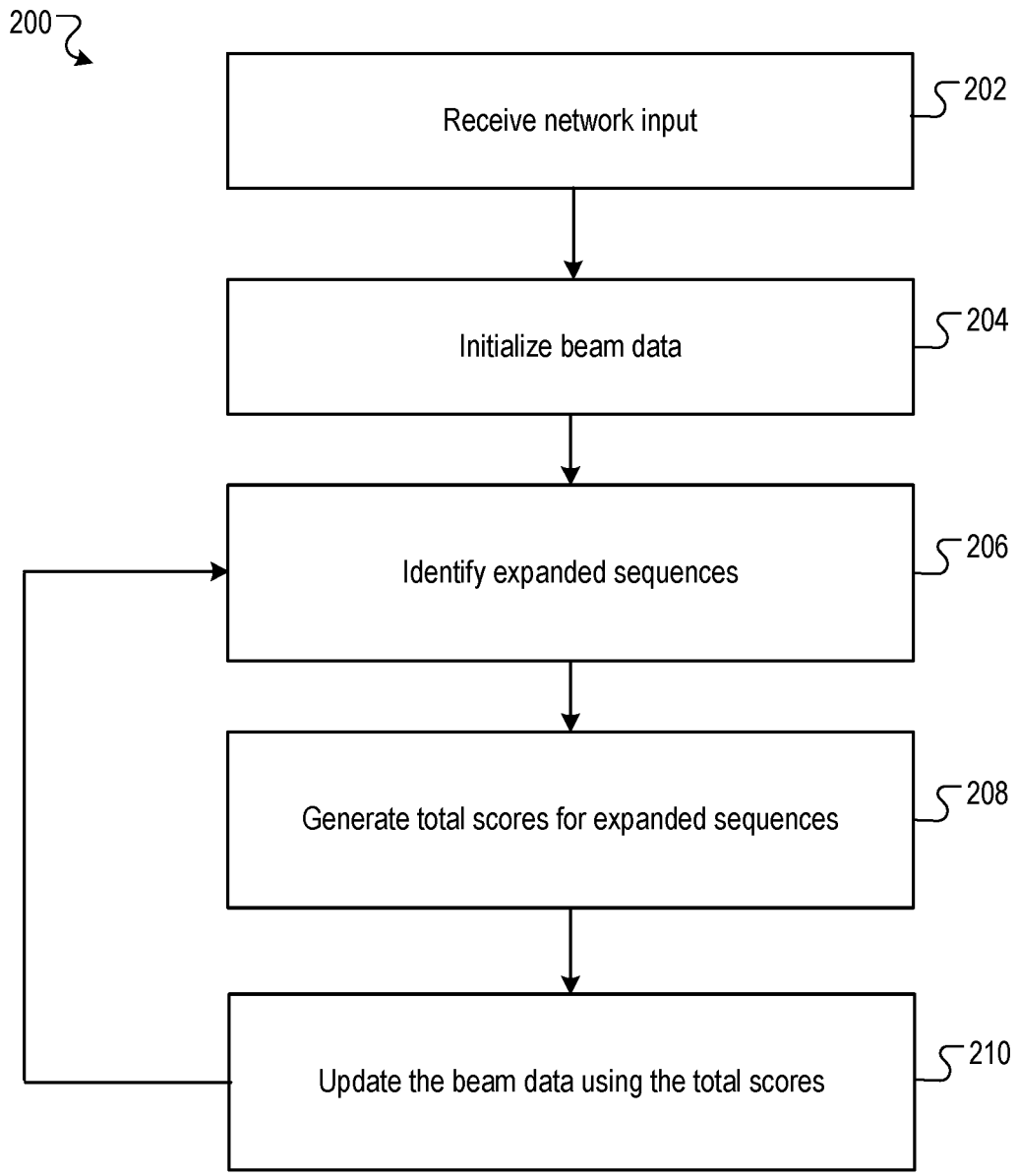
FIG. 2 is a flow diagram of an example process for generating an output sequence.

FIG. 2 is a flow diagram of an example process 200 for generating an output sequence from a network input. For convenience, the process 200 will be described as being performed by a system of one or more computers located in one or more locations. For example, a decoding system, e.g., the decoding system 100 of FIG. 1, appropriately programmed, can perform the process 200.

The system receives a network input (step 202).

The system initializes beam data that identifies a beam, i.e., a set, of candidate output sequences and a respective total score for each candidate output sequence (step 204). Generally, at initialization, the beam includes a fixed number of candidate output sequences, i.e., a number of tokens that is equal to the beam size, and the respective total score for each candidate output sequence is set to zero or another predetermined value. The beam size can be a hyperparameter of the system and can define how computationally efficient the decoding process is, i.e., with larger beam sizes being less computationally efficient than smaller beam sizes.

In some implementations, each candidate output sequence in the beam is empty, i.e., includes zero tokens.

In some other implementations, each candidate output sequence in the beam includes a predetermined start of sequence token.

The system then repeatedly performs decoding steps until one or more criteria for finalizing the beam are satisfied.

At each decoding step, the system performs steps 206, 208, and 210.

In particular, at each decoding step, the system identifies a set of expanded sequences for the decoding step (step 206).

Each expanded sequence corresponds to one of the candidate output sequences in the beam as of the decoding step and includes (i) the corresponding output sequence followed by (ii) a respective additional token from the vocabulary of tokens.

For example, for each particular candidate output sequence in the beam that is not finalized, the system can include, in the set of expanded sequences, a different expanded sequence for each token in the vocabulary, with the expanded sequence for any given token including the particular candidate output sequence followed by the given token.

A candidate output sequence is considered to be "finalized" if the last token in the candidate output sequence is the end of sequence token. A candidate output sequence is considered to be "un-finalized" if the last token in the candidate output sequence is one of the vocabulary tokens (and, therefore, not the end of sequence token).

At each decoding step, the system determines a respective total score for each expanded sequence (step 208).

In particular, the system determines the respective total score for a given expanded sequence as a combination of a backwards-looking score for the given expanded sequence and a forward-looking score for the given expanded sequence.

Computing the respective total scores for the expanded sequences is described below with reference to FIGS. 3 and 4.

At each decoding step, the system updates the beam data using the total scores (step 210).

In particular, the system identifies, from a set that includes (i) the set of expanded sequences and (ii) any finalized candidate output sequences that were in the beam as of the decoding step, the k sequences that have the highest total scores, where k is equal to the beam size.

The system then updates the beam data to identify, as the candidates in the beam, the k highest scoring expanded output sequences and the corresponding total score for each of the k highest scoring expanded output sequences. The system also includes, in the beam data, the corresponding backwards-looking score for each of the k highest scoring expanded output sequences.

The system can determine that the termination criteria are satisfied in any of a variety of ways.

For example, the system can determine that the termination criteria are satisfied at the end of a given decoder step only if all of the candidate output sequences in the beam have been finalized.

As another example, the system can determine that the termination criteria are satisfied at the end of a given decoder step only if (i) the beam includes one or more finalized output sequences and (ii) the highest total score for any un-finalized sequence in the beam is more than a threshold amount less than the highest total score for any finalized sequence in the beam.

As another example, the system can determine that the termination criteria are satisfied at the end of a given decoder step only if (i) the beam includes one or more finalized output sequences and (ii) the highest total score for any finalized sequence in the beam exceeds a threshold score.

As yet another example, the system can determine that the termination criteria are satisfied at the end of a given decoder step only if the beam includes one or more output sequences that have at least a threshold length, i.e., that have at least a threshold number of tokens.

Once the termination criteria have been satisfied, the system can generate an output sequence using the finalized candidate output sequences in the beam.

For example, if the system is required to provide only a single output sequence for a given network input, the system can select the finalized candidate output sequence with the highest total score and then generate the output sequence from the finalized candidate output sequence, e.g., by removing the end of sequence token and, optionally, removing the start of sequence token from the finalized candidate output sequence.

As another example, if the system is required to provide multiple output sequences for a given network input, the system can select the finalized candidate output sequences with the highest total scores and then generate a respective output sequence from each selected finalized candidate output sequence, e.g., by removing the end of sequence token and, optionally, removing the start of sequence token from the finalized candidate output sequence.

In some cases, the system can provide the total scores for the selected finalized candidate output sequences as part of the system output.

Figure 3:
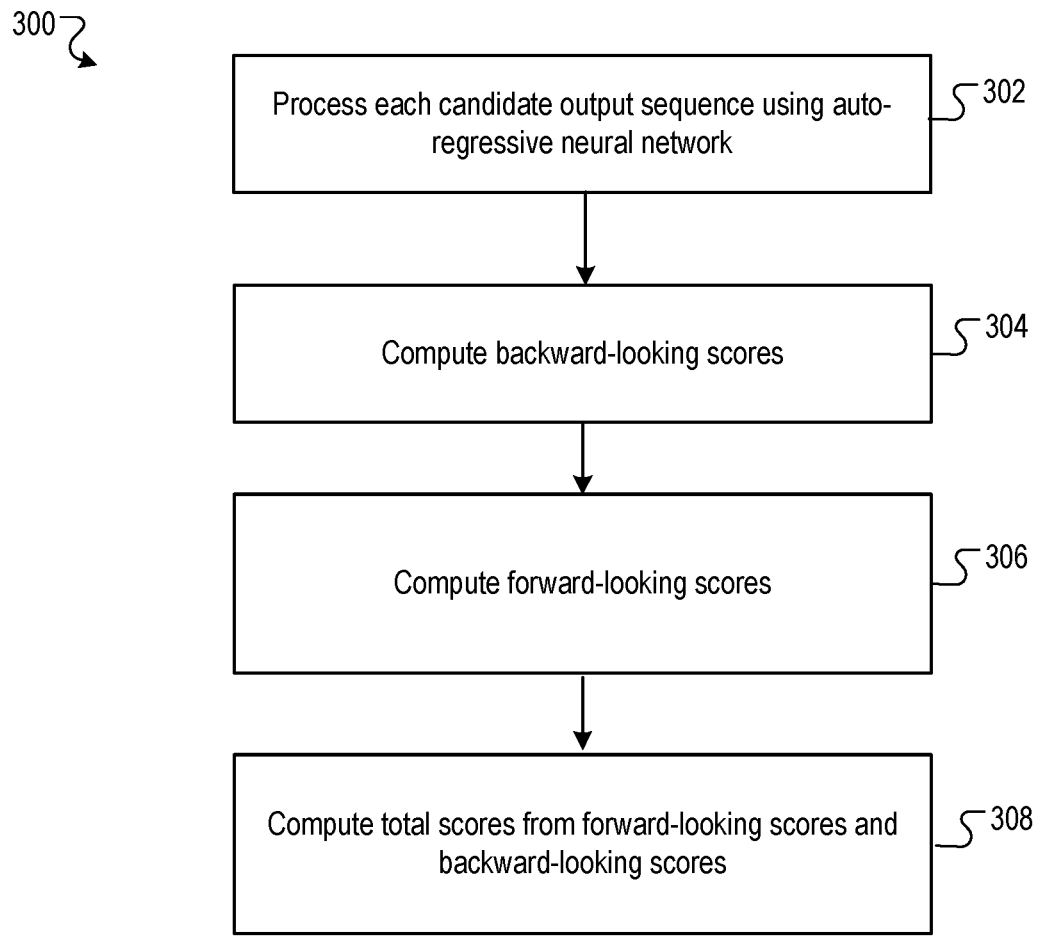
FIG. 3 is a flow diagram of an example process for generating total scores at a given decoding step.

FIG. 3 is a flow diagram of an example process 300 for generating total scores at a given decoding step. For convenience, the process 300 will be described as being performed by a system of one or more computers located in one or more locations. For example, a decoding system, e.g., the decoding system 100 of FIG. 1, appropriately programmed, can perform the process 300.

The system processes each un-finalized candidate output sequence in the beam using the auto-regressive neural network while the auto-regressive neural network is conditioned on the network input to generate a respective score distribution for each un-finalized candidate output sequence (step 302).

The respective score distribution for each un-finalized candidate output sequence includes a respective score for each token in the vocabulary, i.e., with each score representing the likelihood, as predicted by the auto-regressive neural network, that the corresponding token should follow the last token in the candidate output sequence.

The system computes the respective backwards-looking scores for each of the expanded sequences using the respective score distributions (step 304).

In particular, for a given expanded sequence that includes (i) a corresponding one of the candidate output sequences followed by (ii) a given token from the vocabulary, the system can compute the backwards-looking score from the backwards-looking score for the corresponding candidate output sequence and the score for the given token in the score distribution for the corresponding candidate output sequence.

For example, the backwards-looking score can be the sum of (i) the backwards-looking score for the corresponding candidate output sequence and (ii) the logarithm of the score for the given token in the score distribution for the corresponding candidate output sequence.

The system computes the respective forward-looking scores for each of the expanded sequences (step 306).

At a high level, for a given candidate output sequence, the system can generate the respective forward-looking scores for the expanded sequences that were generated from the given candidate output sequence by performing a "greedy rollout" from the most likely expanded sequence for the given candidate output sequence using the auto-regressive neural network.

Performing this greedy rollout and generating the forward-looking scores is described below with reference to FIG. 4.

The system computes a respective total score for each of the expanded sequences using the respective forward-looking score for the expanded sequence and the respective backward-looking score for the expanded sequence (step 308).

In some implementations, the system computes the respective total score as a sum of the respective forward-looking score and the respective backward-looking score.

In some other implementations, in order to prevent the total scores from favoring shorter sequences or sequences that are more likely to terminate within a smaller number of decoding steps after the current decoding step, the system divides the sum by a normalization factor to determine the respective total score. For example, the normalization factor can be based on the total number of tokens in the output sequence generated by performing the greedy rollout, e.g., equal to the total number of tokens or otherwise directly proportional to the total number of tokens.

Figure 4:
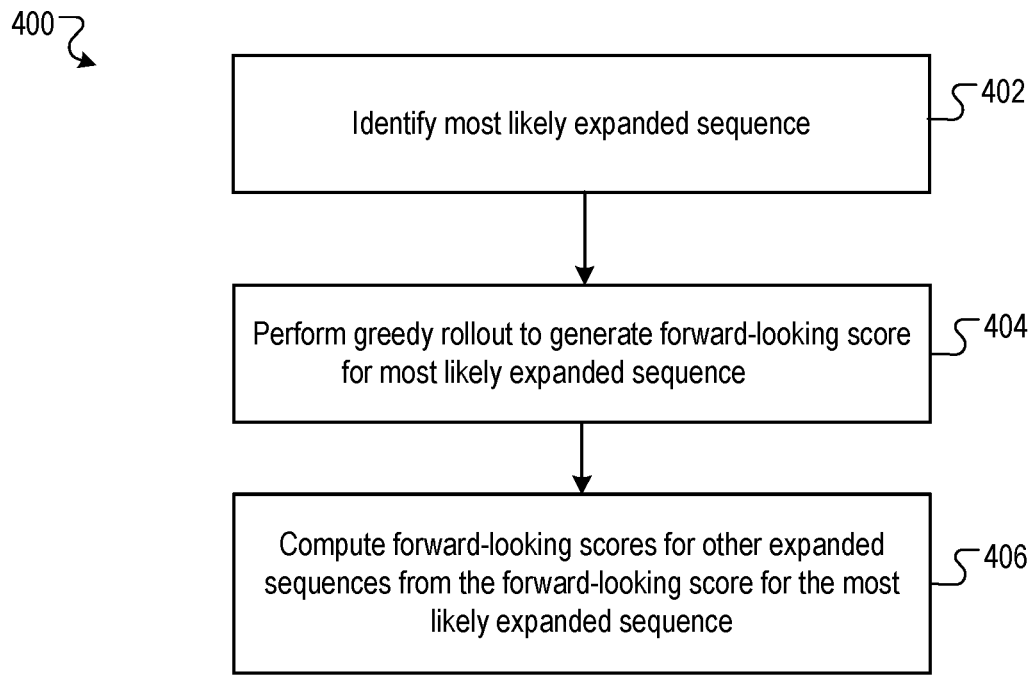
FIG. 4 is a flow diagram of an example process for generating forward-looking scores for expanded sequences at a given time step.

FIG. 4 is a flow diagram of an example process 400 for generating forward-looking scores for expanded sequences at a given time step. For convenience, the process 400 will be described as being performed by a system of one or more computers located in one or more locations. For example, a decoding system, e.g., the decoding system 100 of FIG. 1, appropriately programmed, can perform the process 400.

In particular, the process 400 describes how to generate the forward-looking scores for the expanded sequences that correspond to a given candidate output sequence.

The system can perform the process 400 for each un-finalized candidate output sequence to generate the forward-looking scores for all of the expanded sequences in the set.

The system identifies the most likely expanded sequence corresponding to the given candidate output sequence (step 402). That is, the system can identify the token having the highest score in the score distribution for the given candidate output sequence and then identify, as the most likely expanded sequence, the expanded sequence that has the highest scoring token following the given candidate output sequence.

The system can then perform a greedy rollout using the auto-regressive neural network to generate the forward-looking score for the most likely expanded sequence (step 404).

Performing a "greedy rollout" refers to continuing to append tokens to the most likely expanded sequence until a termination criterion is reached, e.g., the end-of-sequence token is appended or a maximum sequence length is reached. That is, at each step during the greedy rollout, the system processes the current sequence as of the step using the auto-regressive neural network conditioned on the network input to generate a score distribution over the vocabulary of tokens. For the first step during the greedy rollout, the current sequence is the most likely expanded sequence. For each subsequent step, the current sequence is the sequence after the preceding step. The system then "greedily" selects the highest scoring token in the score distribution and appends the highest scoring token to the current sequence.

The system then generates the forward-looking score for the most likely expanded sequence using the scores for the highest scoring tokens at each step of the greedy roll-out. For example, the forward-looking score can be the sum of the logarithms of the scores for the highest scoring tokens at each step of the greedy rollout.

The system then computes the forward-looking scores for the other expanded sequences that correspond to the given candidate output sequence from the forward-looking score for the most likely expanded sequence (step 406).

That is, the system can compute forward-looking scores for the other expanded sequence without performing greedy rollouts for the other expanded sequences. Thus, the system can effectively compute forward-looking scores by performing only a single greedy rollout for each un-finalized candidate output sequence. Because only a single greedy rollout for is performed for each candidate and because the greedy rollout is performed using the same neural network that is already being used to generate the score distributions at each time step, computing forward-looking scores can be done with minimal additional computational overhead.

As a particular example, the system can compute the forward-looking score for a given other expanded sequence based on the forward-looking score for the most likely expanded output sequence, the score for the highest-scoring token, and the score for the token that follows the candidate output sequence in the given other expanded output sequence.

More specifically, the system can modify the forward-looking score for the most likely expanded output sequence using the score for the highest-scoring token, and the score for the token that follows the candidate output sequence in the given other expanded output sequence.

As a particular example, the forward-looking score f(y$^p$·y) for a given expanded output sequence that includes a token y appended to a candidate output sequence y$^p$ can satisfy:

$$f(y^p \circ y) = f(y^p \circ y^*) + \log\left(\frac{p(y \mid y^p)}{p(y^* \mid y^p)}\right),$$

where f(y$^p$·y*) is the forward-looking score for the most likely expanded output sequence that includes the highest-scoring token y* appended to the candidate output sequence y$^p$, p(y|y$^p$) is the score for the token y that follows the candidate output sequence y$^p$, and p(y*|y$^p$) is the score for the highest-scoring token y*.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for generating an output sequence that comprises a plurality of vocabulary of tokens that are each selected from a vocabulary of tokens that comprises a set of vocabulary tokens and an end of sequence token, the method comprising:
   obtaining a network input;
   initializing beam data specifying a set of k candidate output sequences and a respective total score for each of the candidate output sequences, wherein k is an integer greater than or equal to one;
   updating the beam data at each of a plurality of decoding steps, the updating comprising, at each decoding step:
      processing each candidate output sequence in the beam data as of the decoding step using an auto-regressive neural network that is conditioned on the network input to generate a score distribution that comprises a respective score for each token in the vocabulary;
      identifying a plurality of expanded sequences, wherein each expanded sequence corresponds to a respective candidate output sequence and includes the tokens from the corresponding candidate output sequence followed by a respective additional token from the vocabulary;
      generating, for each expanded sequence, a respective backwards-looking score based on the respective score for the respective additional token in the score distribution generated for the corresponding candidate output sequence by the auto-regressive neural network;
      generating, for each expanded sequence and using the auto-regressive neural network, a respective forward-looking score that estimates a score for a highest-scoring partial output sequence that has the expanded sequence as a prefix;

computing, for each expanded sequence, the respective total score from the respective forward-looking score for the expanded sequence and the respective backwards-looking score for the expanded sequence; and
updating the set of k candidate output sequences using the respective total scores for the expanded sequences.

2. The method of claim 1, further comprising:
after updating the beam at each of the plurality of decoding steps:
selecting one of the candidate output sequences in the beam, and
generating the output sequence for the network input using the selected candidate output sequence.

3. The method of claim 1, the updating comprising, at each decoding step:
determining whether one or more termination criteria are satisfied based on the candidate output sequences in the beam after updating the beam at the decoding step; and
determining to perform another decoding step only in response to determining that the one or more termination criteria are not satisfied.

4. The method of claim 1, wherein updating the set of k candidate output sequences using the respective total scores for the expanded sequences comprises:
selecting, as the k candidate output sequences in the updated set of k candidate output sequences, the k sequences having highest respective total scores from among (i) the expanded sequences and (ii) any finalized candidate output sequences in the set of k candidate output sequences as of the update iteration.

5. The method of claim 4, wherein a finalized candidate output sequence is a candidate output sequence that ends with the end of sequence token.

6. The method of claim 1, wherein generating, for each expanded sequence and using the auto-regressive neural network, a respective forward-looking score that estimates a score for a highest-scoring partial output sequence that has the expanded sequence as a prefix comprises:
for each given candidate output sequence:
identifying a most likely expanded sequence corresponding to the given candidate output sequence;
performing a greedy rollout using the auto-regressive neural network to generate a forward-looking score for the most likely expanded sequence; and
computing respective forward-looking scores for other expanded sequences that correspond to the given candidate output sequence from the forward-looking score for the most likely expanded sequence.

7. The method of claim 6, wherein identifying a most likely expanded sequence corresponding to the given candidate output sequence comprises identifying the token having the highest score in the score distribution for the given candidate output sequence and identifying, as the most likely expanded sequence, the expanded sequence that has the highest scoring token following the given candidate output sequence.

8. The method of claim 6, wherein computing respective forward-looking scores for other expanded sequences that correspond to the given candidate output sequence from the forward-looking score for the most likely expanded sequence, comprises, for each other expanded sequence:
computing the respective forward-looking score for the other expanded sequence based on the forward-looking score for the most likely expanded output sequence, the score for the highest-scoring token, and the score for the token that follows the candidate output sequence in the other expanded output sequence.

9. The method of claim 6, wherein performing a greedy rollout using the auto-regressive neural network to generate a forward-looking score for the most likely expanded sequence comprises:
appending tokens to the most likely expanded sequence using the auto-regressive neural network at respective steps of the greedy roll-out until a termination criterion is reached; and
generating the forward-looking score for the most likely expanded sequence using the scores for the highest scoring tokens at each respective step of the greedy roll-out.

10. A system comprising:
one or more computers; and
one or more storage devices storing instructions that, when executed by the one or more computers, cause the one or more computers to perform operations for generating an output sequence that comprises a plurality of vocabulary of tokens that are each selected from a vocabulary of tokens that comprises a set of vocabulary tokens and an end of sequence token, the operations comprising:
obtaining a network input;
initializing beam data specifying a set of k candidate output sequences and a respective total score for each of the candidate output sequences, wherein k is an integer greater than or equal to one;
updating the beam data at each of a plurality of decoding steps, the updating comprising, at each decoding step:
processing each candidate output sequence in the beam data as of the decoding step using an auto-regressive neural network that is conditioned on the network input to generate a score distribution that comprises a respective score for each token in the vocabulary;
identifying a plurality of expanded sequences, wherein each expanded sequence corresponds to a respective candidate output sequence and includes the tokens from the corresponding candidate output sequence followed by a respective additional token from the vocabulary;
generating, for each expanded sequence, a respective backwards-looking score based on the respective score for the respective additional token in the score distribution generated for the corresponding candidate output sequence by the auto-regressive neural network;
generating, for each expanded sequence and using the auto-regressive neural network, a respective forward-looking score that estimates a score for a highest-scoring partial output sequence that has the expanded sequence as a prefix;
computing, for each expanded sequence, the respective total score from the respective forward-looking score for the expanded sequence and the respective backwards-looking score for the expanded sequence; and
updating the set of k candidate output sequences using the respective total scores for the expanded sequences.

11. The system of claim 10, the operations further comprising:
after updating the beam at each of the plurality of decoding steps:
selecting one of the candidate output sequences in the beam, and generating the output sequence for the network input using the selected candidate output sequence.

12. The system of claim 10, the updating comprising, at each decoding step:
determining whether one or more termination criteria are satisfied based on the candidate output sequences in the beam after updating the beam at the decoding step; and
determining to perform another decoding step only in response to determining that the one or more termination criteria are not satisfied.

13. The system of claim 10, wherein updating the set of k candidate output sequences using the respective total scores for the expanded sequences comprises:
selecting, as the k candidate output sequences in the updated set of k candidate output sequences, the k sequences having highest respective total scores from among (i) the expanded sequences and (ii) any finalized candidate output sequences in the set of k candidate output sequences as of the update iteration.

14. The system of claim 13, wherein a finalized candidate output sequence is a candidate output sequence that ends with the end of sequence token.

15. The system of claim 10, wherein generating, for each expanded sequence and using the auto-regressive neural network, a respective forward-looking score that estimates a score for a highest-scoring partial output sequence that has the expanded sequence as a prefix comprises:
for each given candidate output sequence:
identifying a most likely expanded sequence corresponding to the given candidate output sequence;
performing a greedy rollout using the auto-regressive neural network to generate a forward-looking score for the most likely expanded sequence; and
computing respective forward-looking scores for other expanded sequences that correspond to the given candidate output sequence from the forward-looking score for the most likely expanded sequence.

16. The system of claim 15, wherein identifying a most likely expanded sequence corresponding to the given candidate output sequence comprises identifying the token having the highest score in the score distribution for the given candidate output sequence and identifying, as the most likely expanded sequence, the expanded sequence that has the highest scoring token following the given candidate output sequence.

17. The system of claim 15, wherein computing respective forward-looking scores for other expanded sequences that correspond to the given candidate output sequence from the forward-looking score for the most likely expanded sequence, comprises, for each other expanded sequence:
computing the respective forward-looking score for the other expanded sequence based on the forward-looking score for the most likely expanded output sequence, the score for the highest-scoring token, and the score for the token that follows the candidate output sequence in the other expanded output sequence.

18. The system of claim 15, wherein performing a greedy rollout using the auto-regressive neural network to generate a forward-looking score for the most likely expanded sequence comprises:
appending tokens to the most likely expanded sequence using the auto-regressive neural network at respective steps of the greedy roll-out until a termination criterion is reached; and
generating the forward-looking score for the most likely expanded sequence using the scores for the highest scoring tokens at each respective step of the greedy roll-out.

19. One or more non-transitory computer-readable storage media storing instructions that when executed by one or more computers cause the one or more computers to perform operations for generating an output sequence that comprises a plurality of vocabulary of tokens that are each selected from a vocabulary of tokens that comprises a set of vocabulary tokens and an end of sequence token, the operations comprising:
obtaining a network input;
initializing beam data specifying a set of k candidate output sequences and a respective total score for each of the candidate output sequences, wherein k is an integer greater than or equal to one;
updating the beam data at each of a plurality of decoding steps, the updating comprising, at each decoding step:
processing each candidate output sequence in the beam data as of the decoding step using an auto-regressive neural network that is conditioned on the network input to generate a score distribution that comprises a respective score for each token in the vocabulary;
identifying a plurality of expanded sequences, wherein each expanded sequence corresponds to a respective candidate output sequence and includes the tokens from the corresponding candidate output sequence followed by a respective additional token from the vocabulary;
generating, for each expanded sequence, a respective backwards-looking score based on the respective score for the respective additional token in the score distribution generated for the corresponding candidate output sequence by the auto-regressive neural network;
generating, for each expanded sequence and using the auto-regressive neural network, a respective forward-looking score that estimates a score for a highest-scoring partial output sequence that has the expanded sequence as a prefix;
computing, for each expanded sequence, the respective total score from the respective forward-looking score for the expanded sequence and the respective backwards-looking score for the expanded sequence; and
updating the set of k candidate output sequences using the respective total scores for the expanded sequences.

20. The media of claim 19, the operations further comprising:
after updating the beam at each of the plurality of decoding steps:
selecting one of the candidate output sequences in the beam, and
generating the output sequence for the network input using the selected candidate output sequence.

* * * * *